United States Patent [19]
Nunes, Jr. et al.

[11] Patent Number: 5,280,695
[45] Date of Patent: Jan. 25, 1994

[54] WIDE AREA LAWNMOWER

[75] Inventors: John F. Nunes, Jr., Modesto; Aaron M. Days, Turlock; Gilbert W. Borba; Manuel Furtado, Jr., both of Patterson, all of Calif.

[73] Assignee: Nunes Manufacturing, Inc., Patterson, Calif.

[21] Appl. No.: 832,858

[22] Filed: Feb. 7, 1992

[51] Int. Cl.$^5$ ............................................. A01D 75/30
[52] U.S. Cl. ........................................ 56/6; 56/13.5; 56/15.2; 56/DIG. 9; 56/DIG. 14
[58] Field of Search ................. 56/6, 13.5, 13.7, 15.2, 56/15.8, 16.9, DIG. 9, DIG. 14

[56] References Cited
U.S. PATENT DOCUMENTS

| | | | |
|---|---|---|---|
| 2,830,421 | 4/1958 | Blue et al. | 56/6 |
| 3,058,280 | 10/1962 | Lewis | 56/6 |
| 4,697,404 | 10/1987 | Brockmeier et al. | 56/6 |
| 4,854,112 | 8/1989 | Holley et al. | 56/6 |
| 5,069,022 | 12/1991 | Vandermark | 56/6 |
| 5,133,174 | 7/1992 | Parsons, Jr. | 56/15.2 X |

Primary Examiner—Terry Lee Melius
Attorney, Agent, or Firm—Flehr, Hohbach, Test, Albritton & Herbert

[57] ABSTRACT

Wide area mower which can be attached to and detached from a tractor in a relatively short time. In one disclosed embodiment, the mower has a main frame which is detachably connected to the rear mount of a tractor, swing frames pivotally connected to the main frame for movement into and out of engagement with the side mounts of the tractor, means detachably locking the swing frames in engagement with the side mounts, and mowing heads mounted on the frames to the sides and rear of the tractor. In another disclosed embodiment, the mower includes a frame adapted for connection to a towing vehicle, a pair of side decks positioned on opposite sides of the frame, a center deck positioned between the side decks, a pair of rear decks positioned to the rear of and between the side decks and the center deck. Ground engaging wheels at the front and rear of each deck support the decks, with the wheels at the rear of the side decks and the center deck being aligned with the wheels at the front of the rear decks, and means pivotally mounting the decks to the frame so that the decks can follow the contour of the ground.

23 Claims, 20 Drawing Sheets

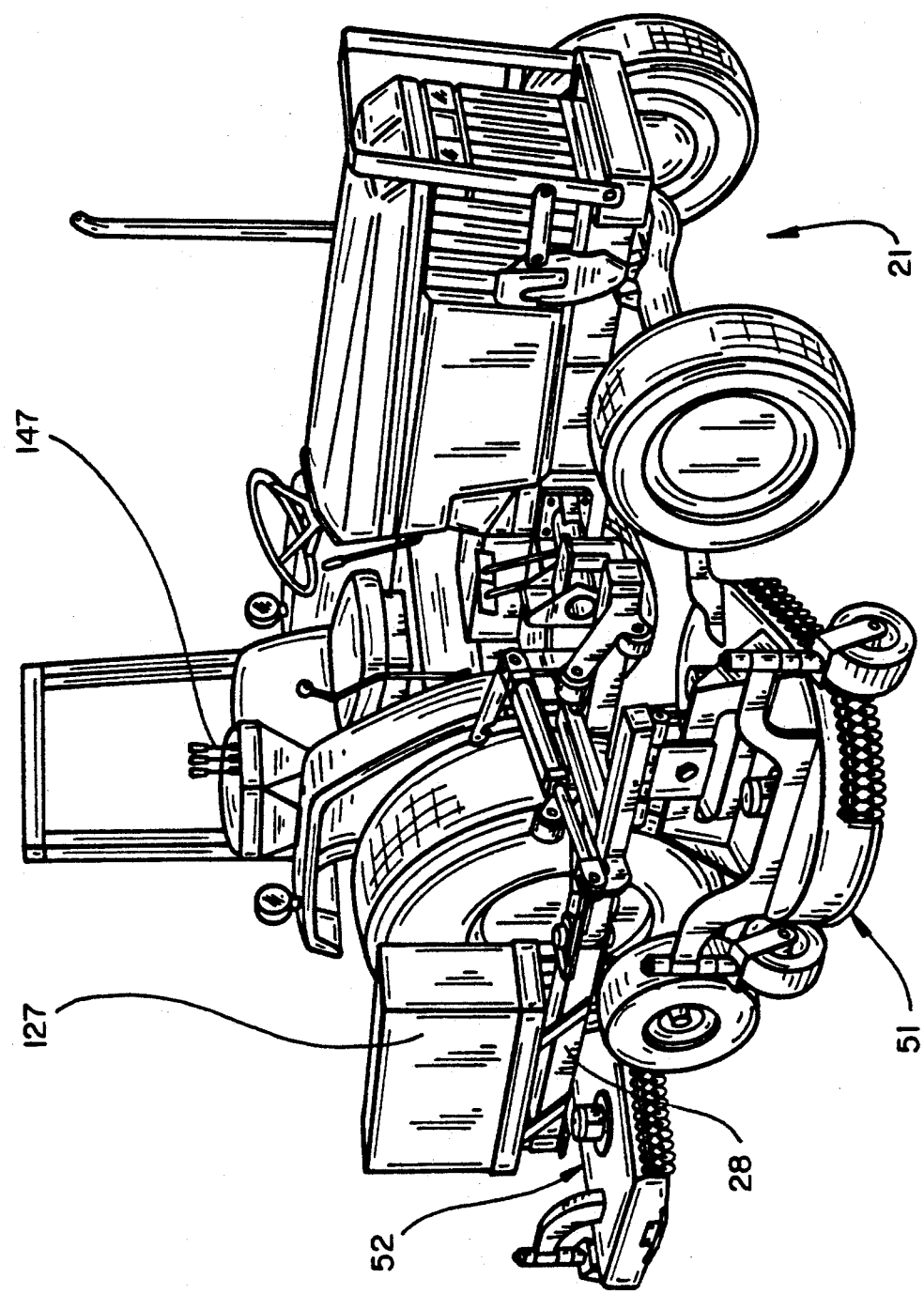

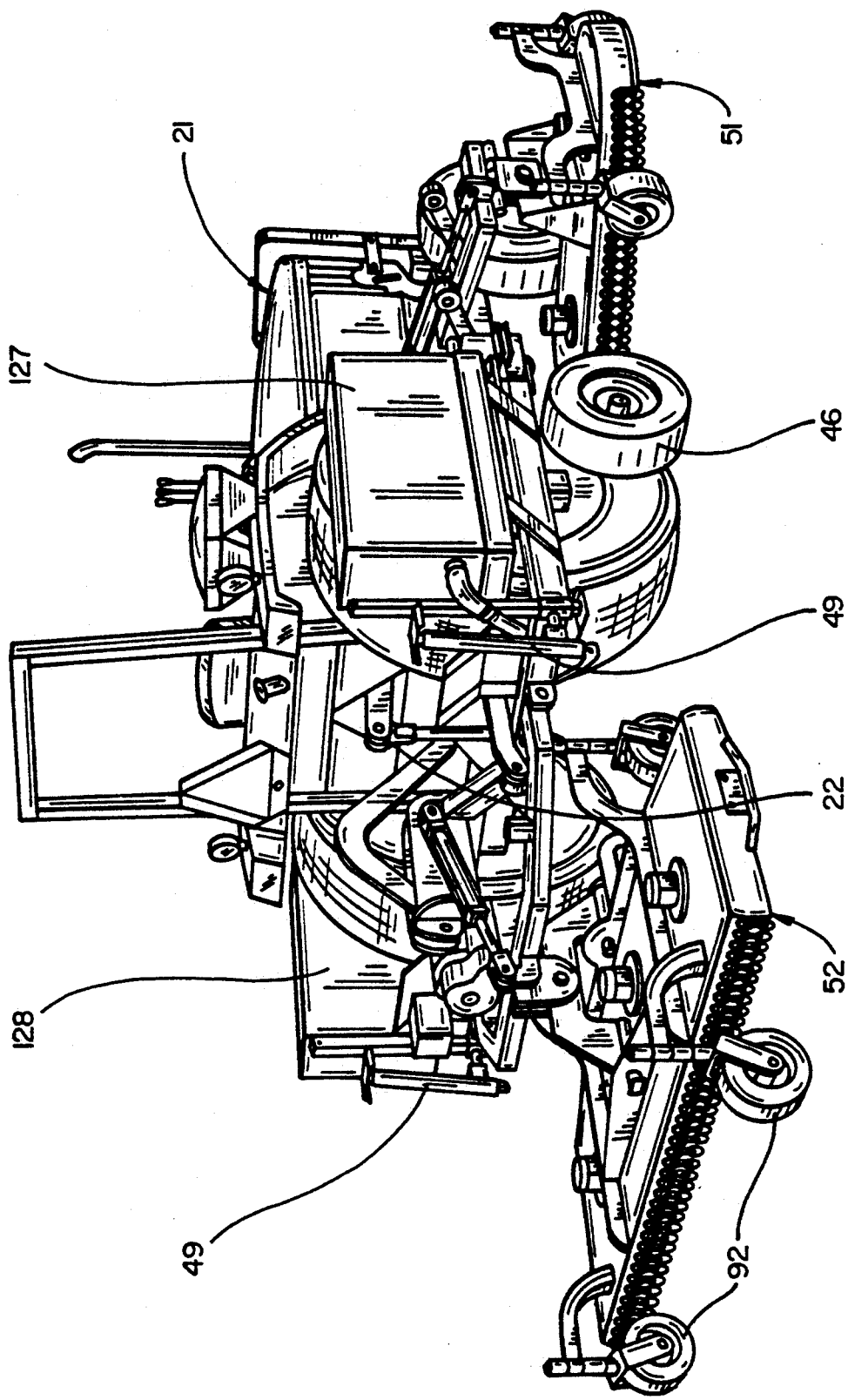
FIG_2

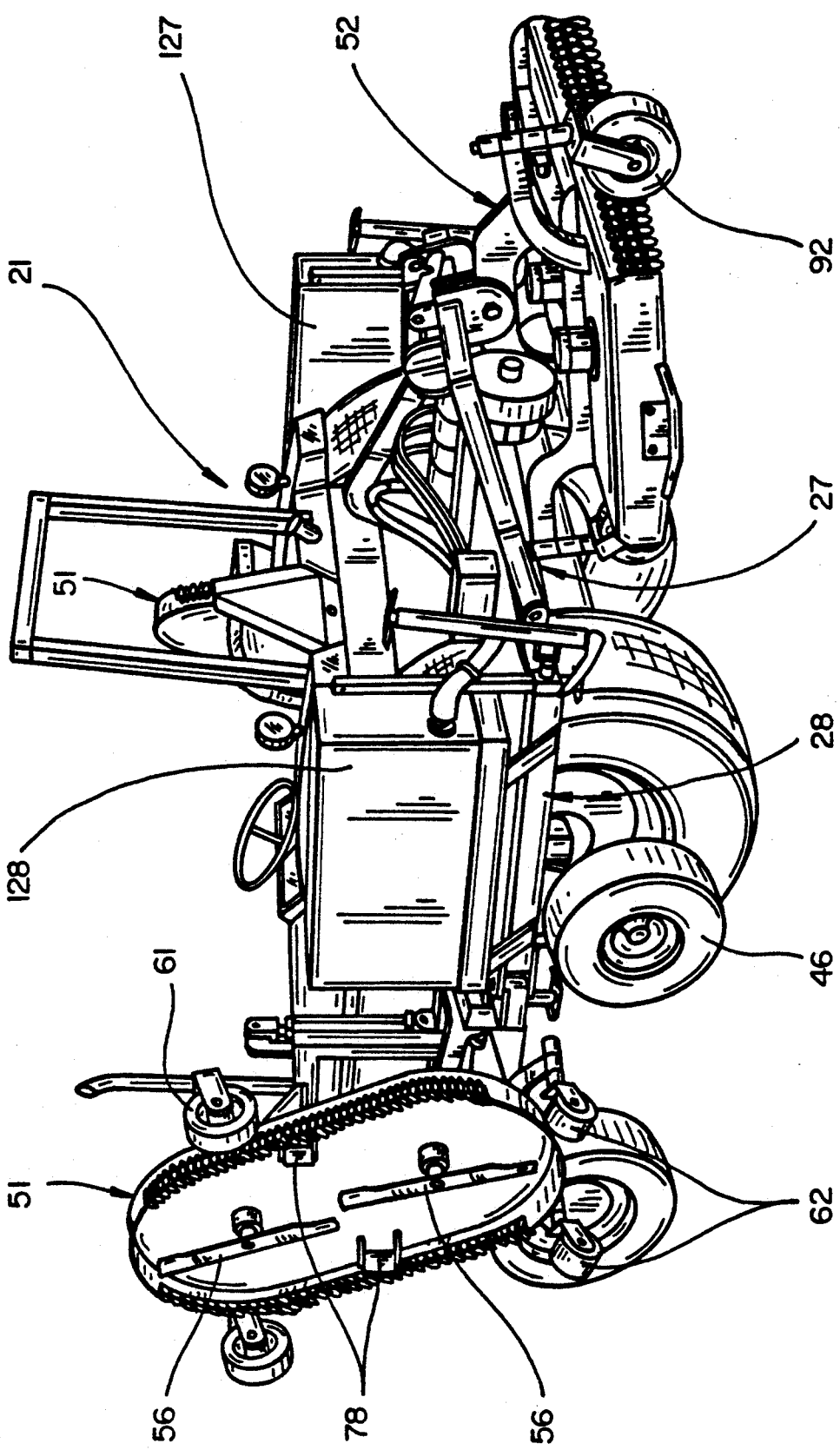
FIG_3

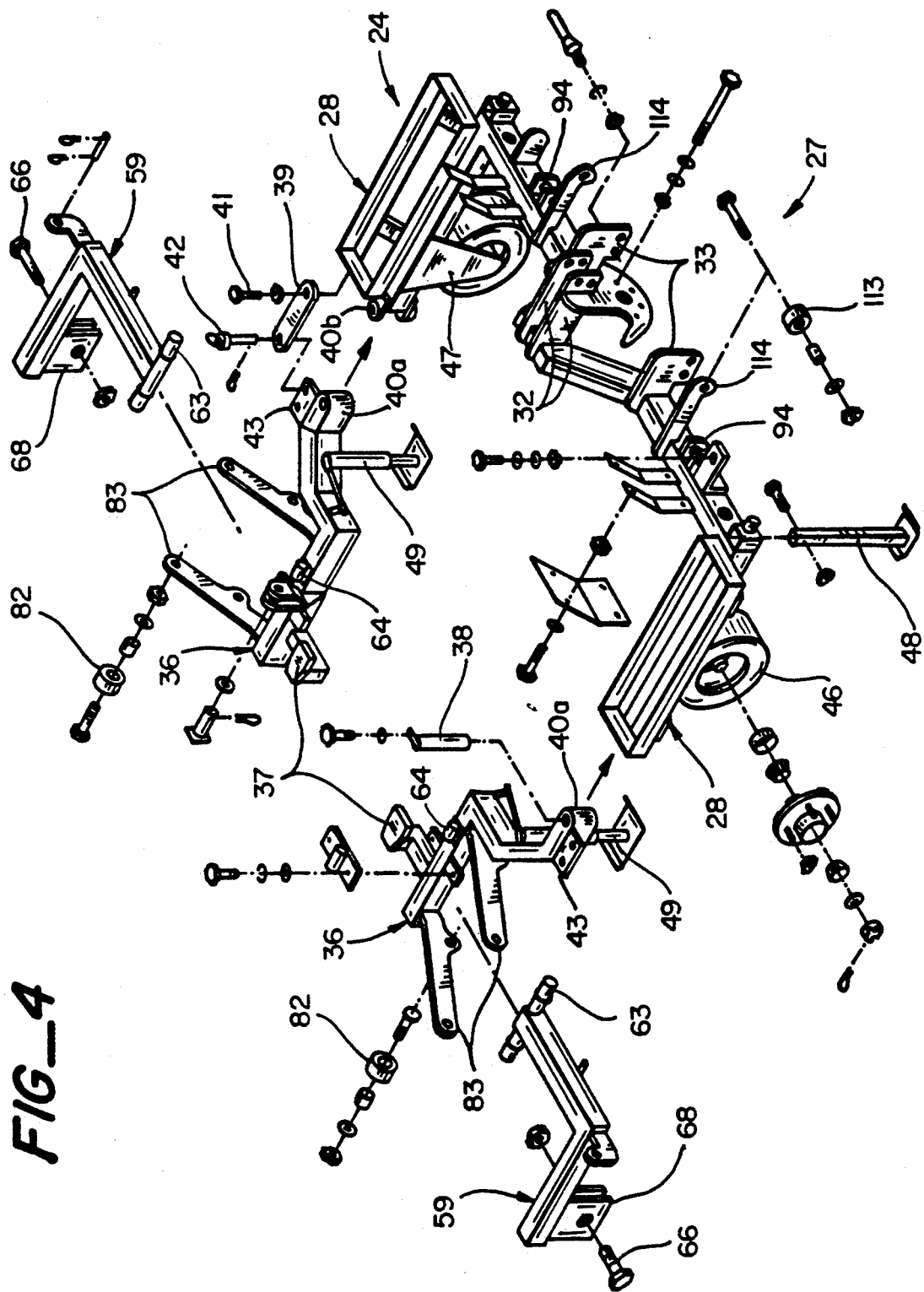

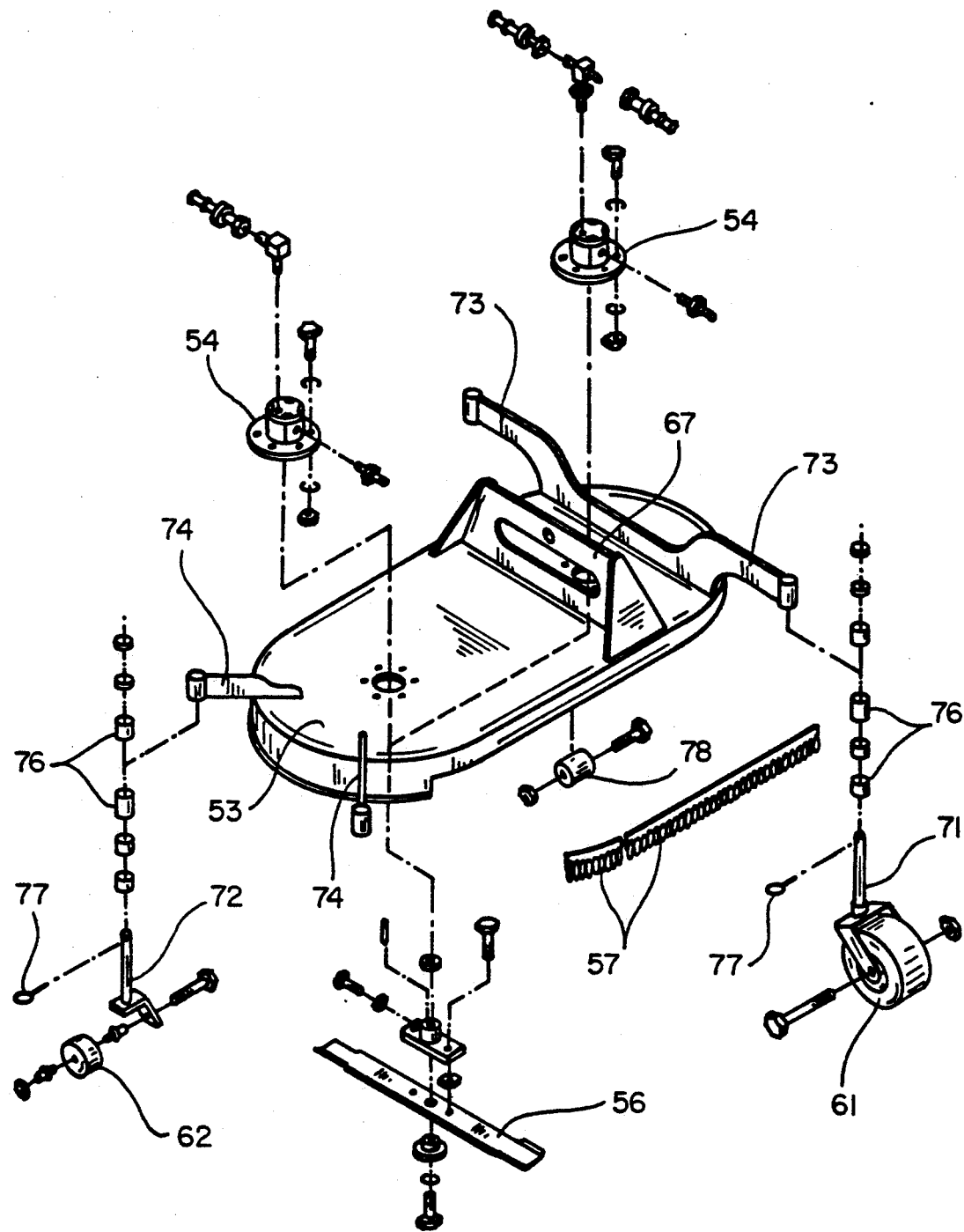
FIG_5

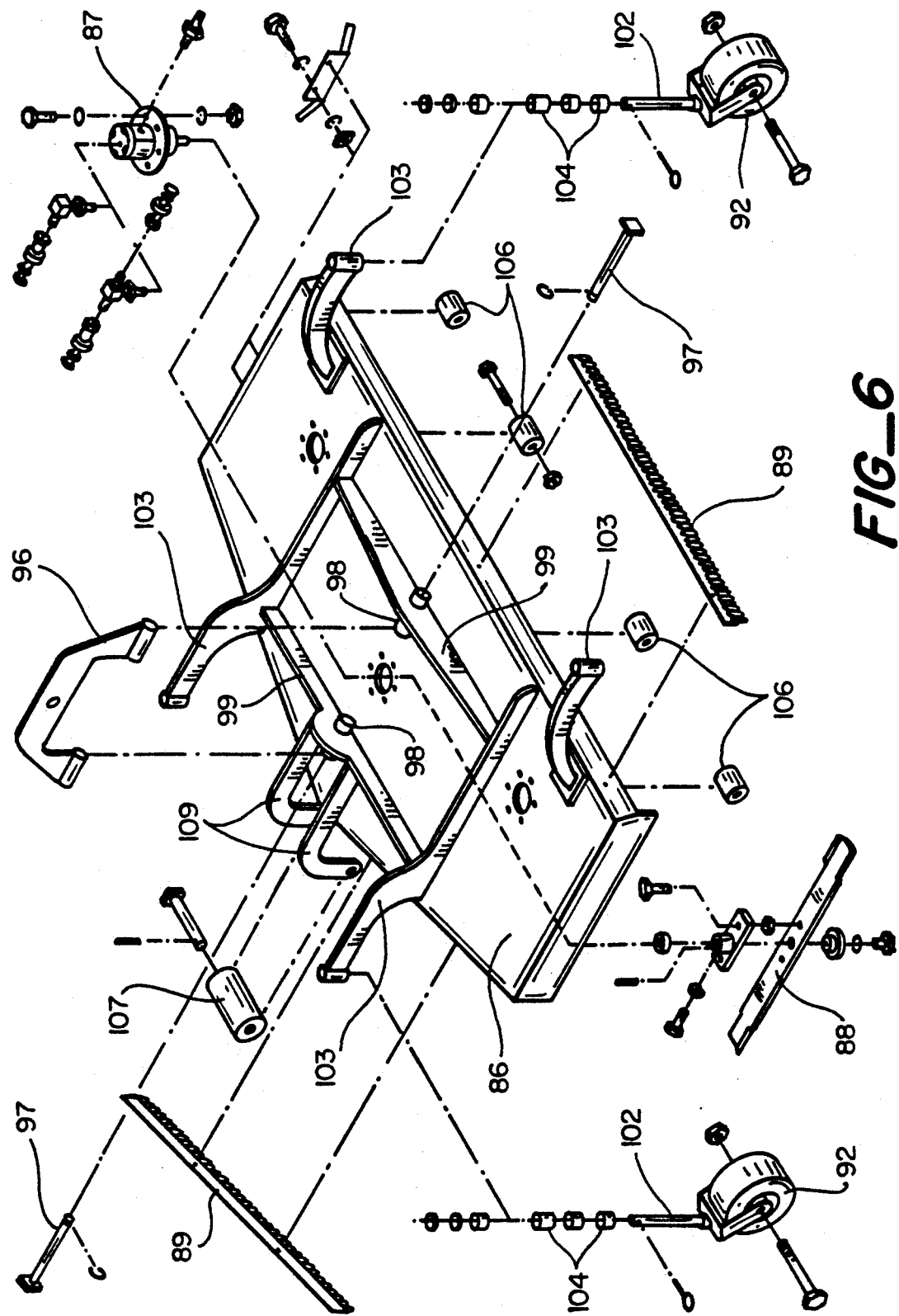
FIG_6

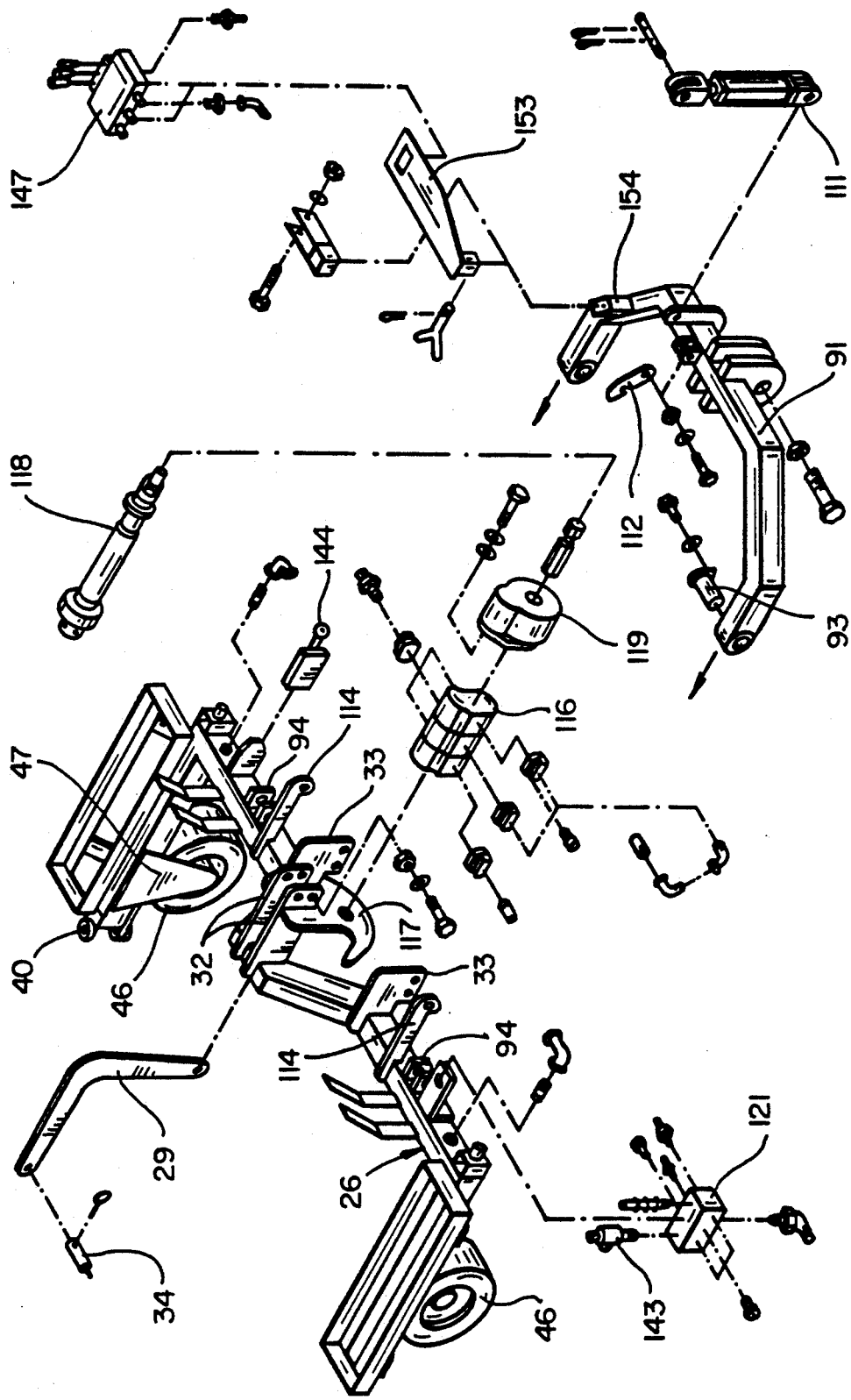

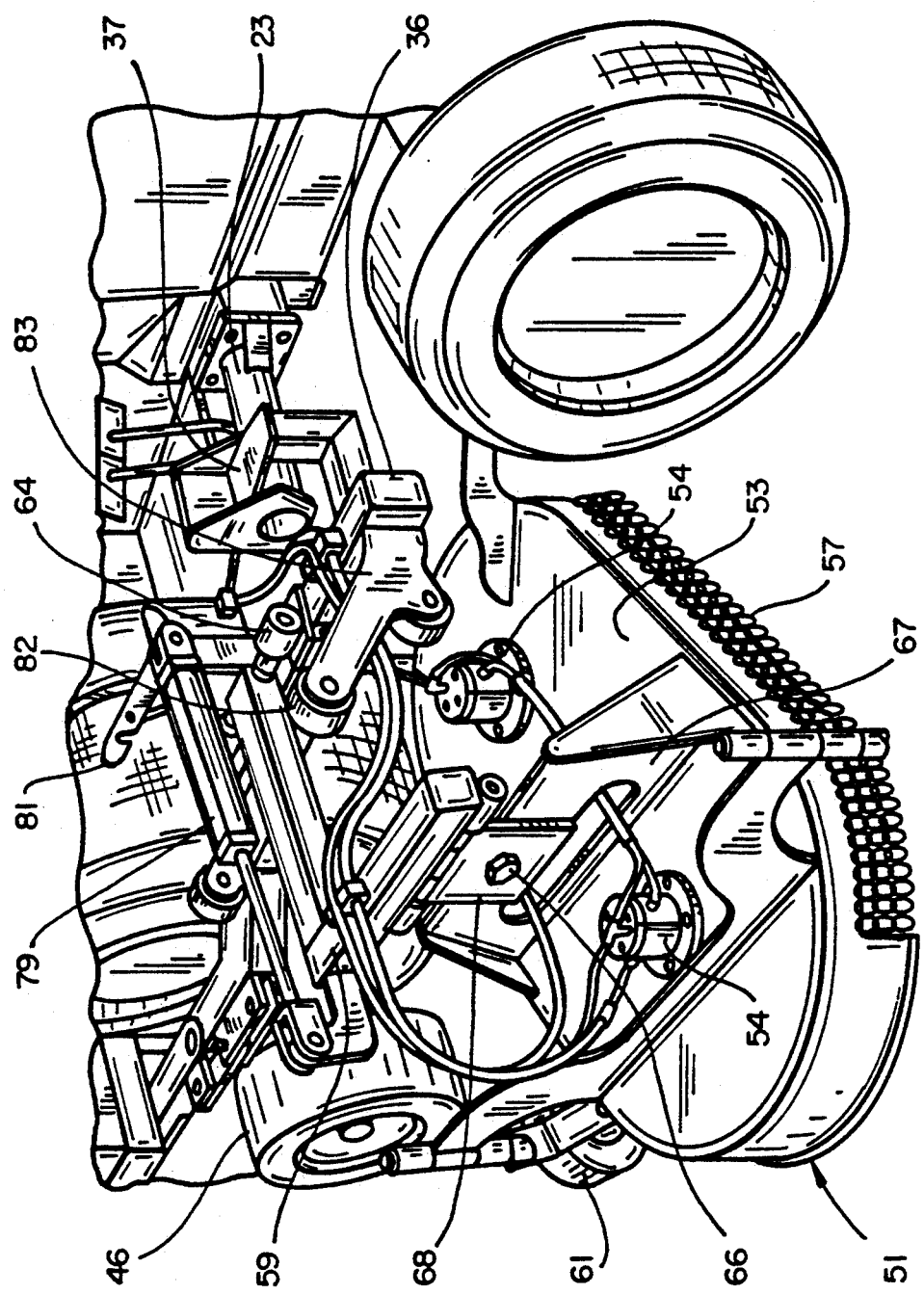
FIG_8

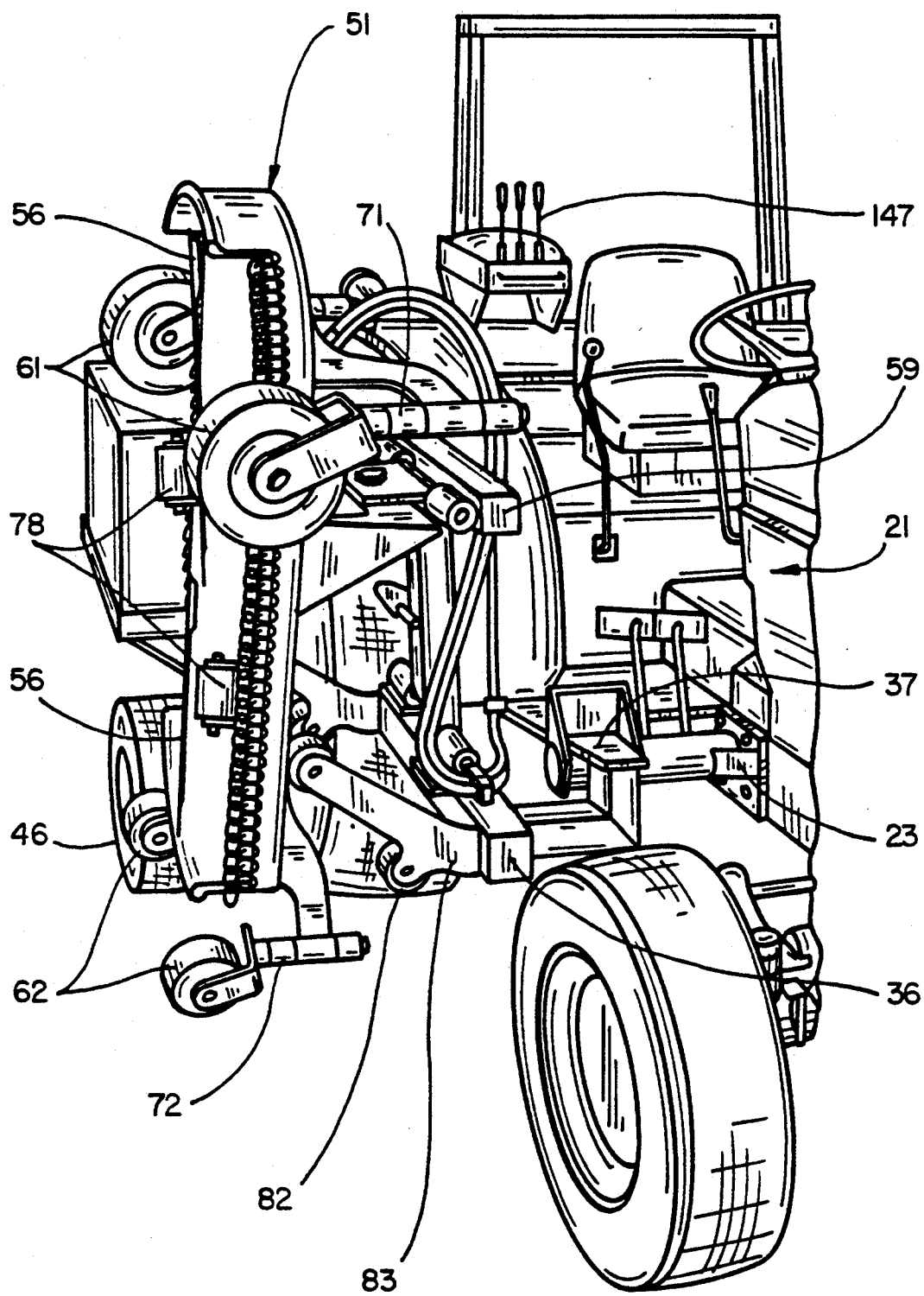
FIG_9

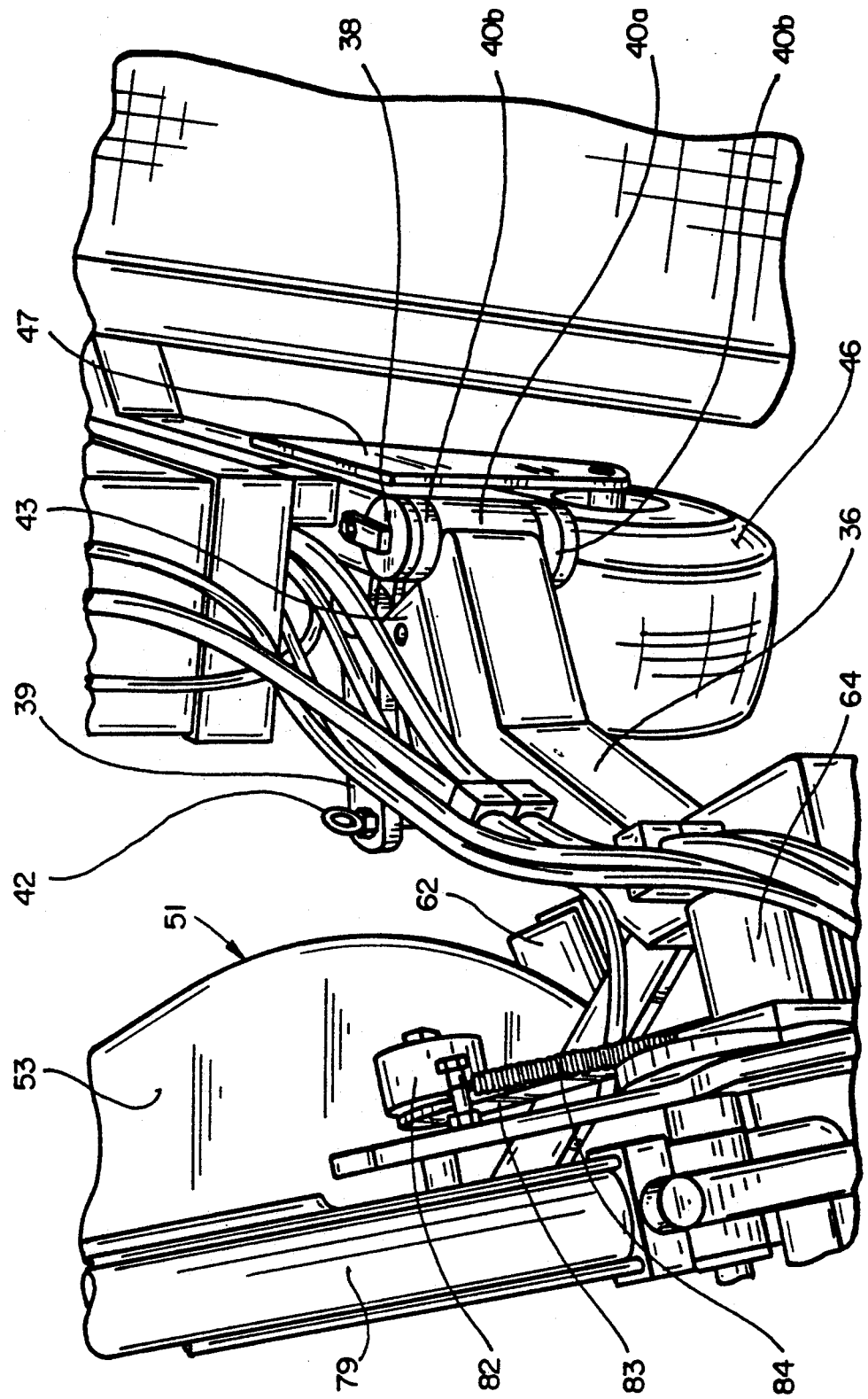
FIG_10

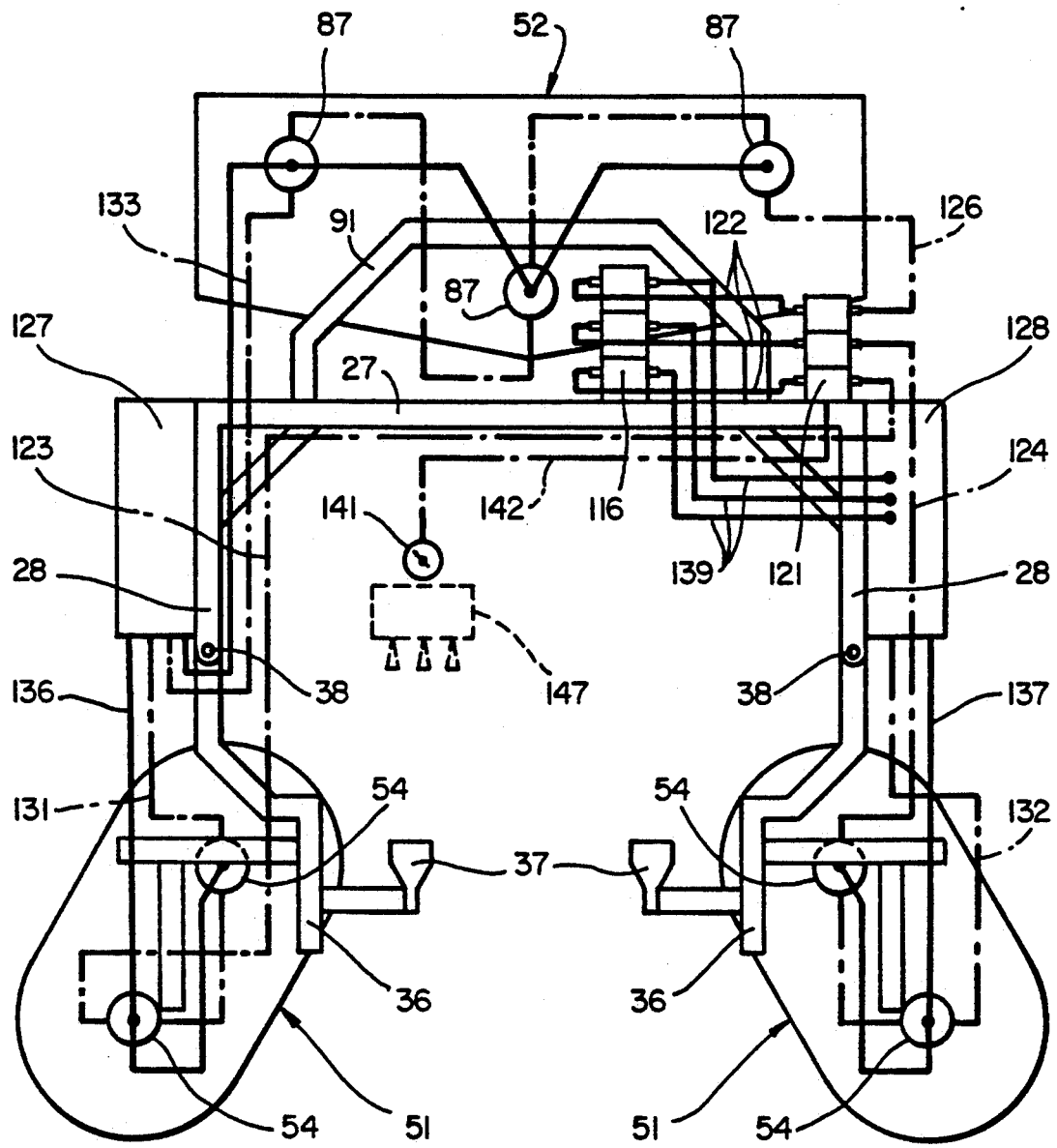
FIG_11

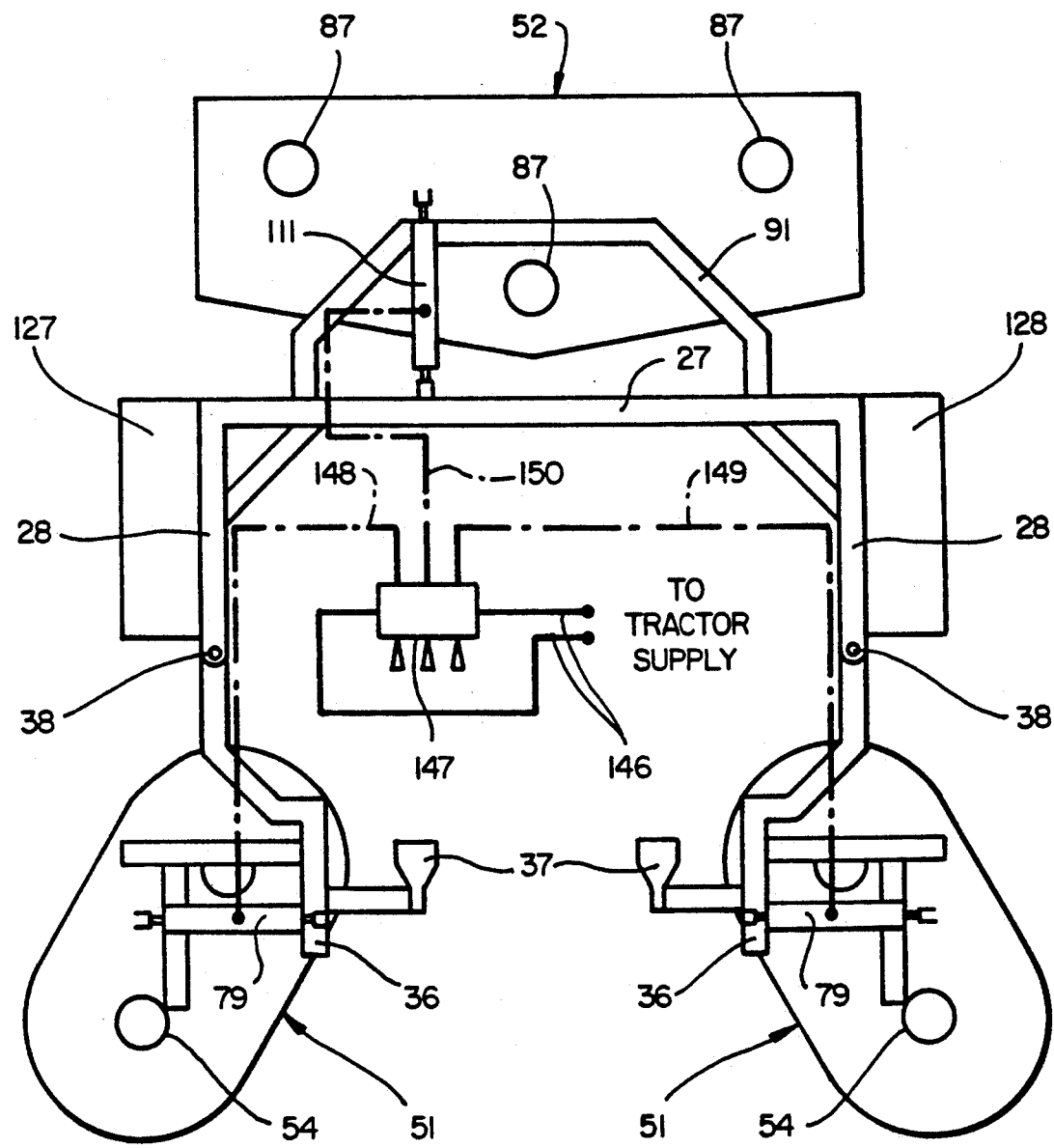
FIG_12

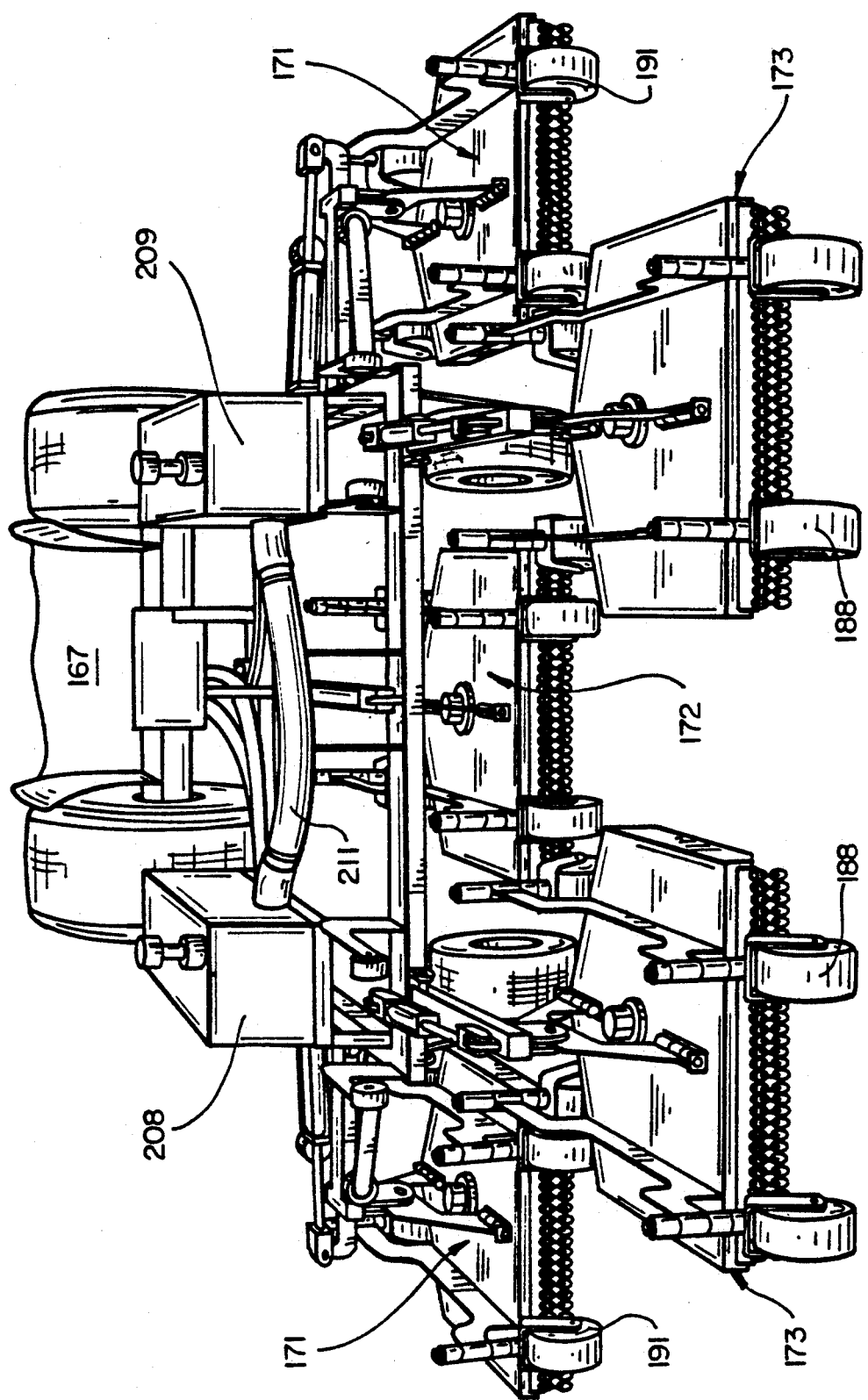
FIG_13

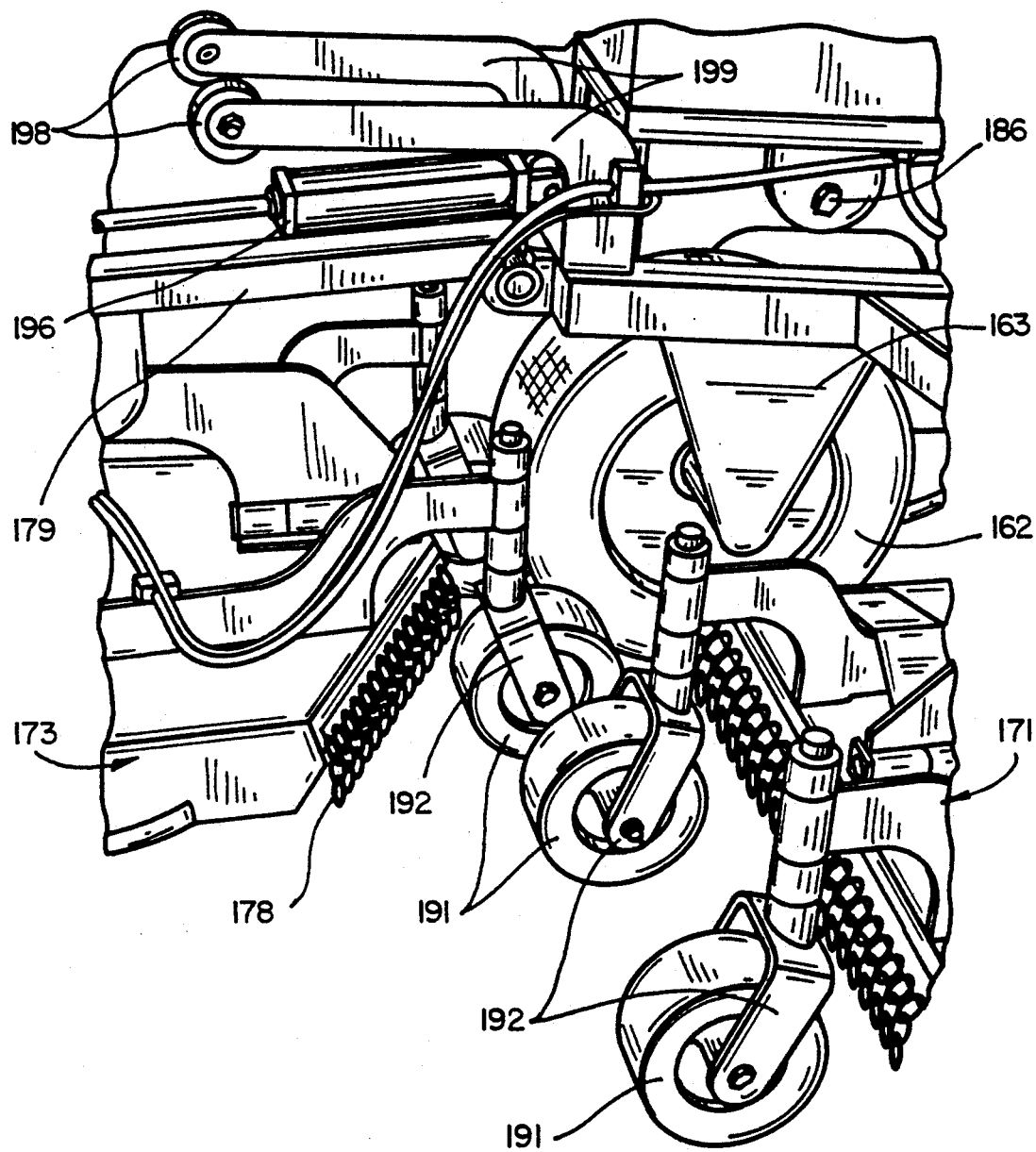
FIG_14

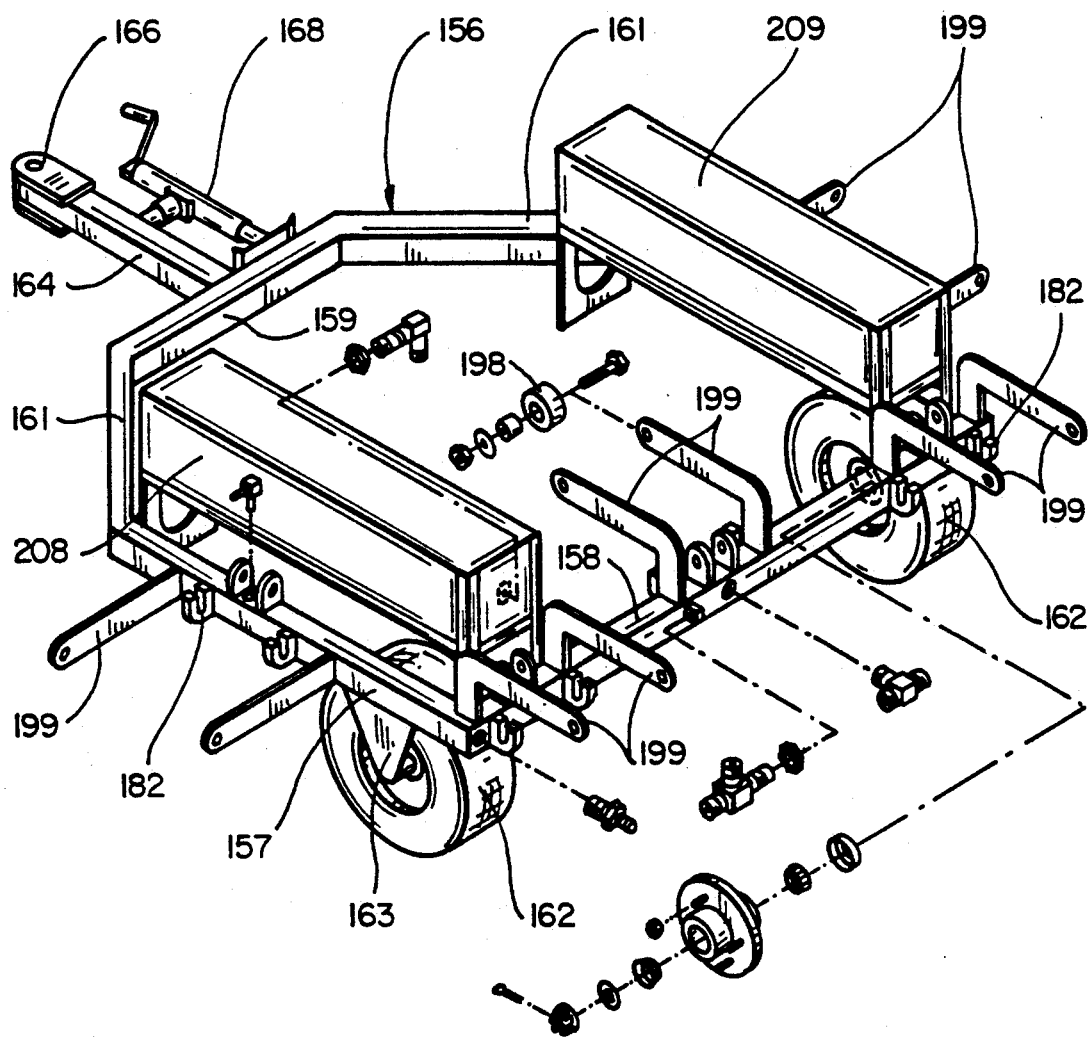
FIG_15

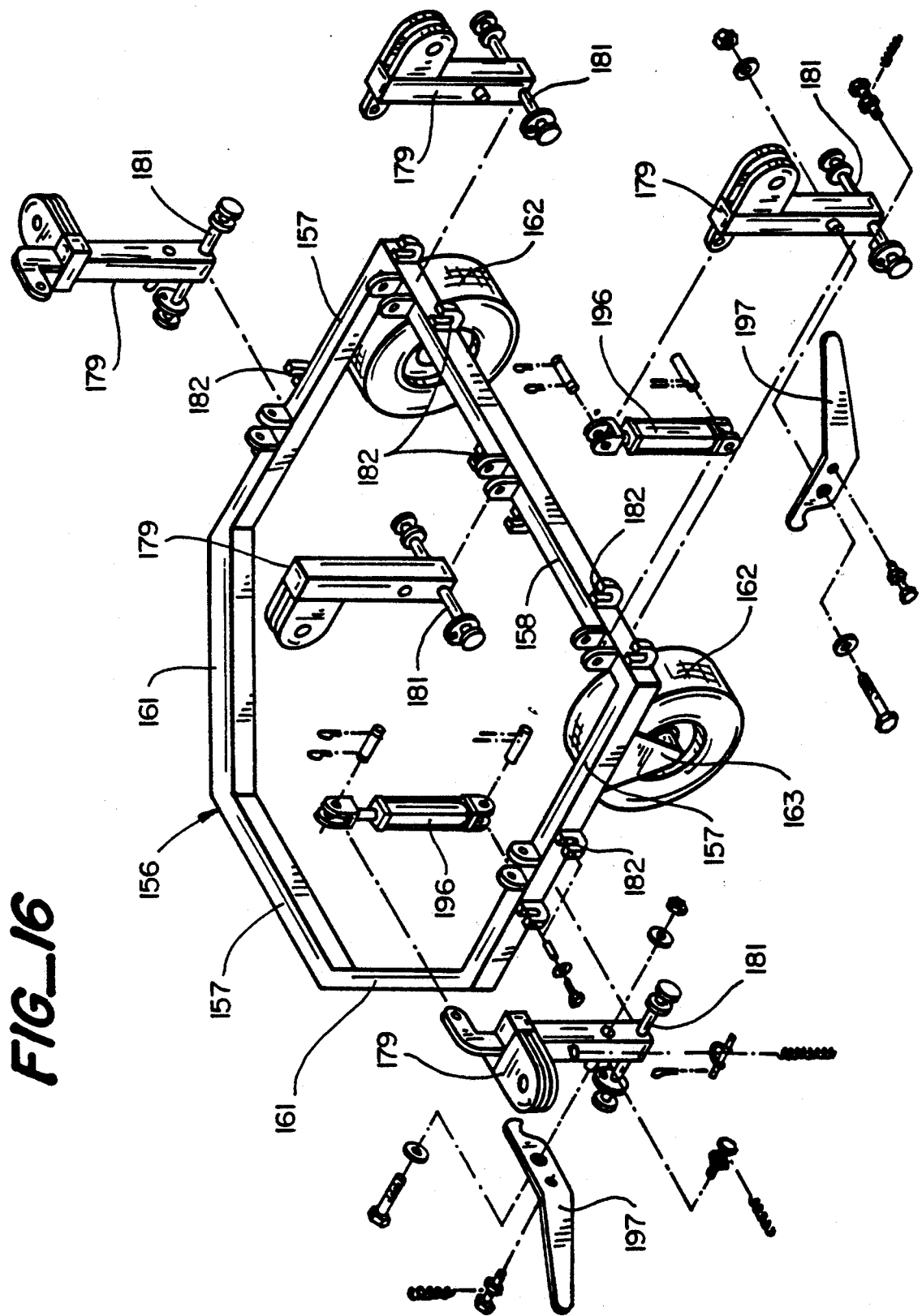
FIG_16

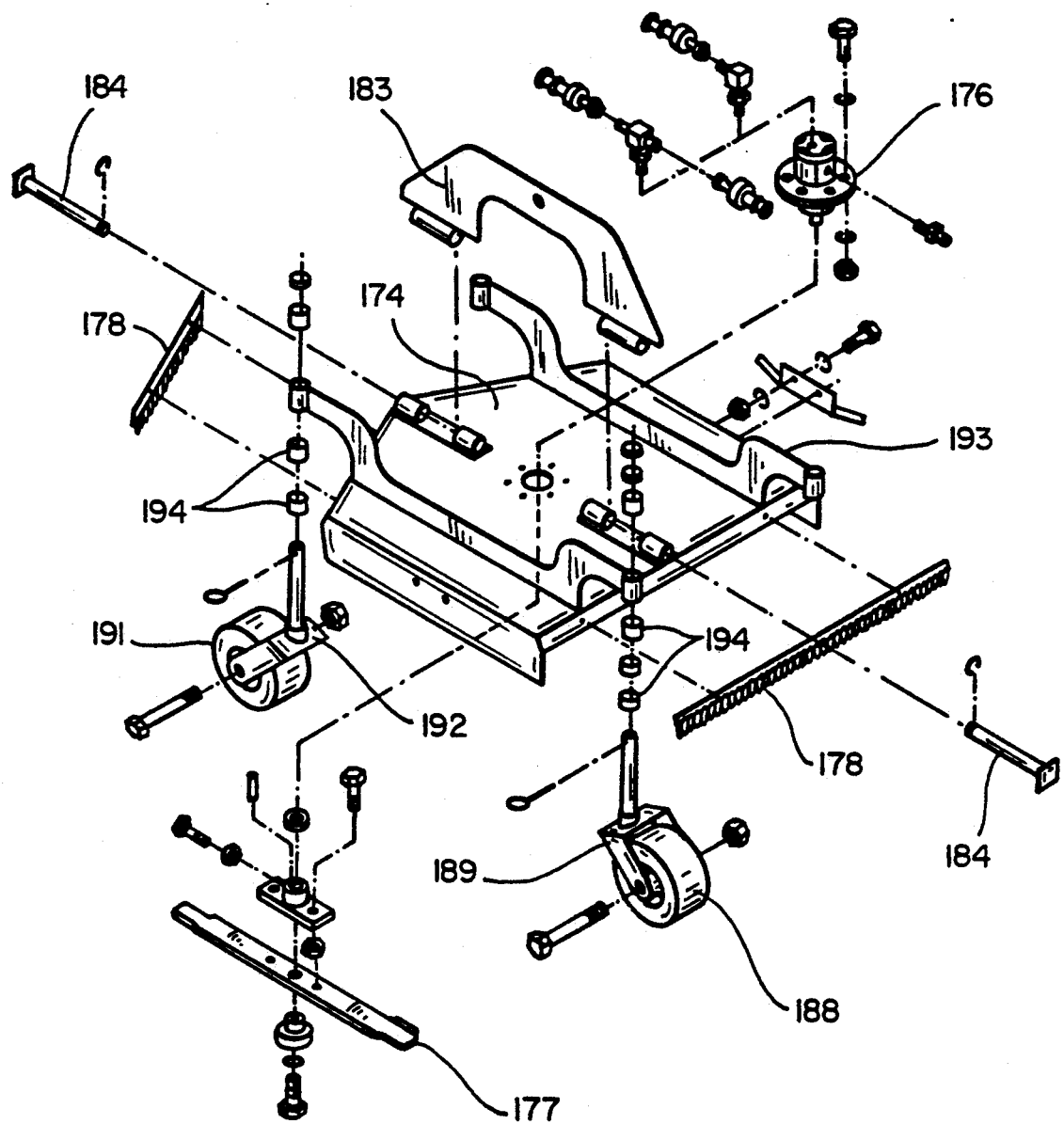
FIG_17

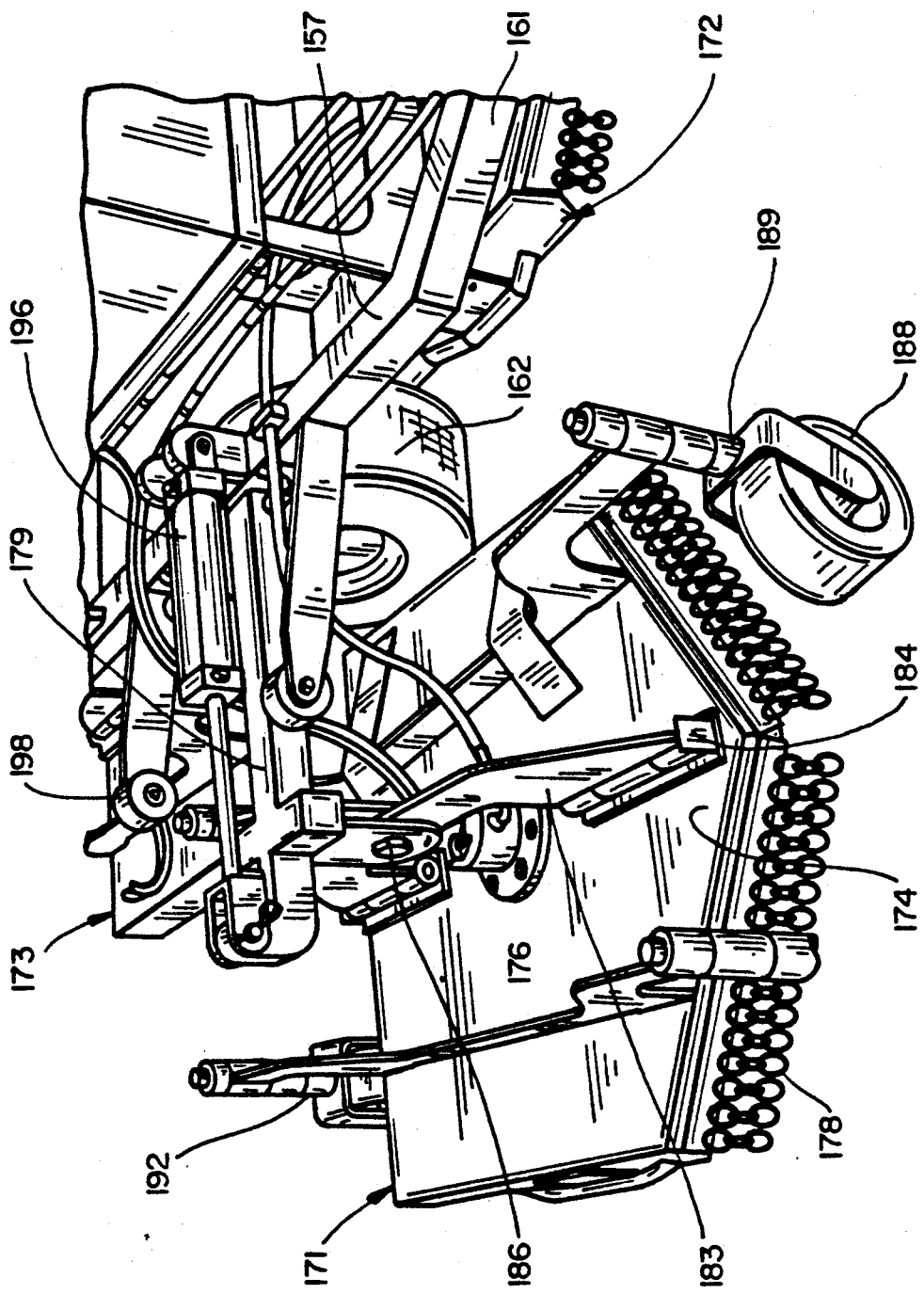

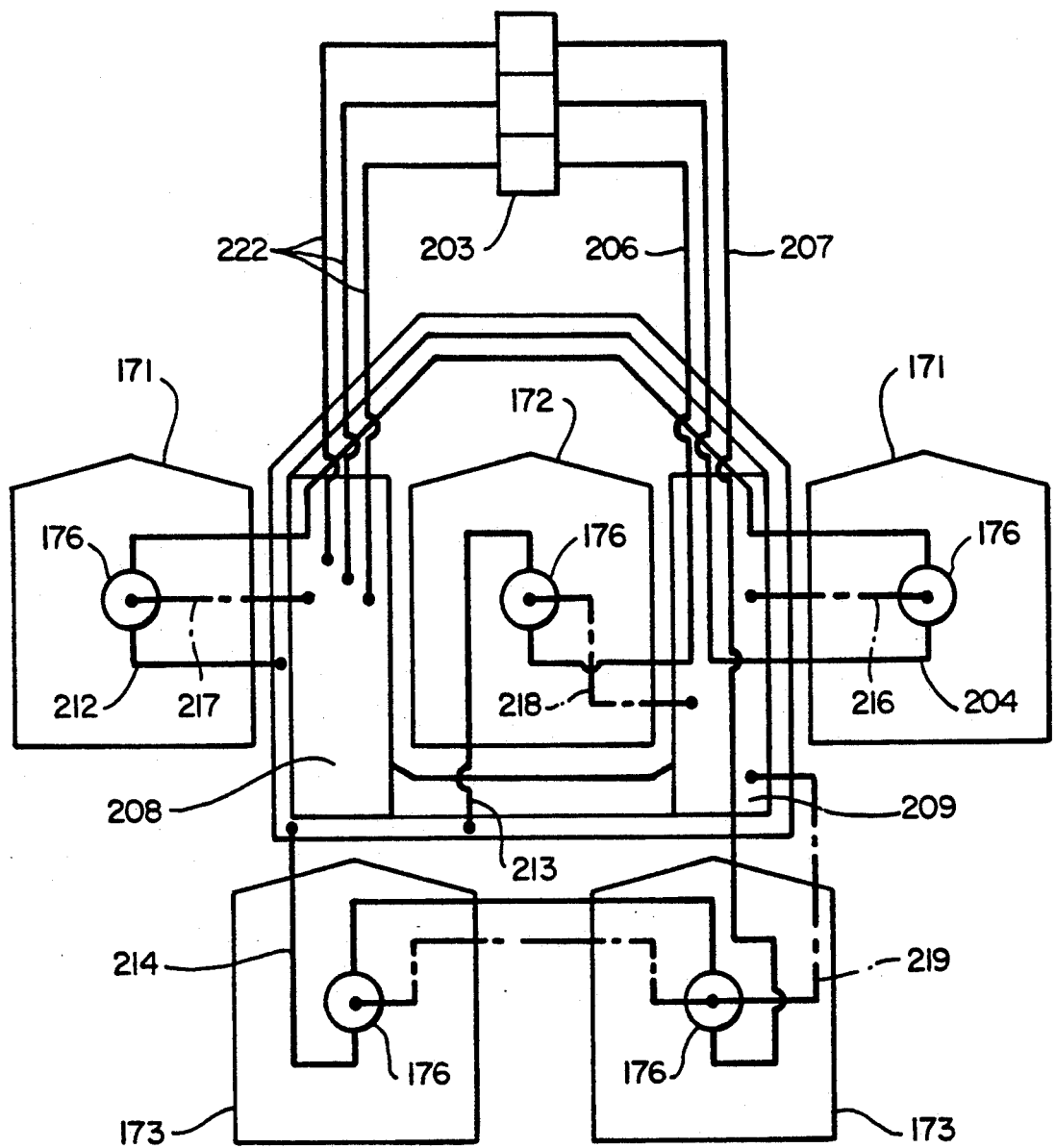
FIG_19

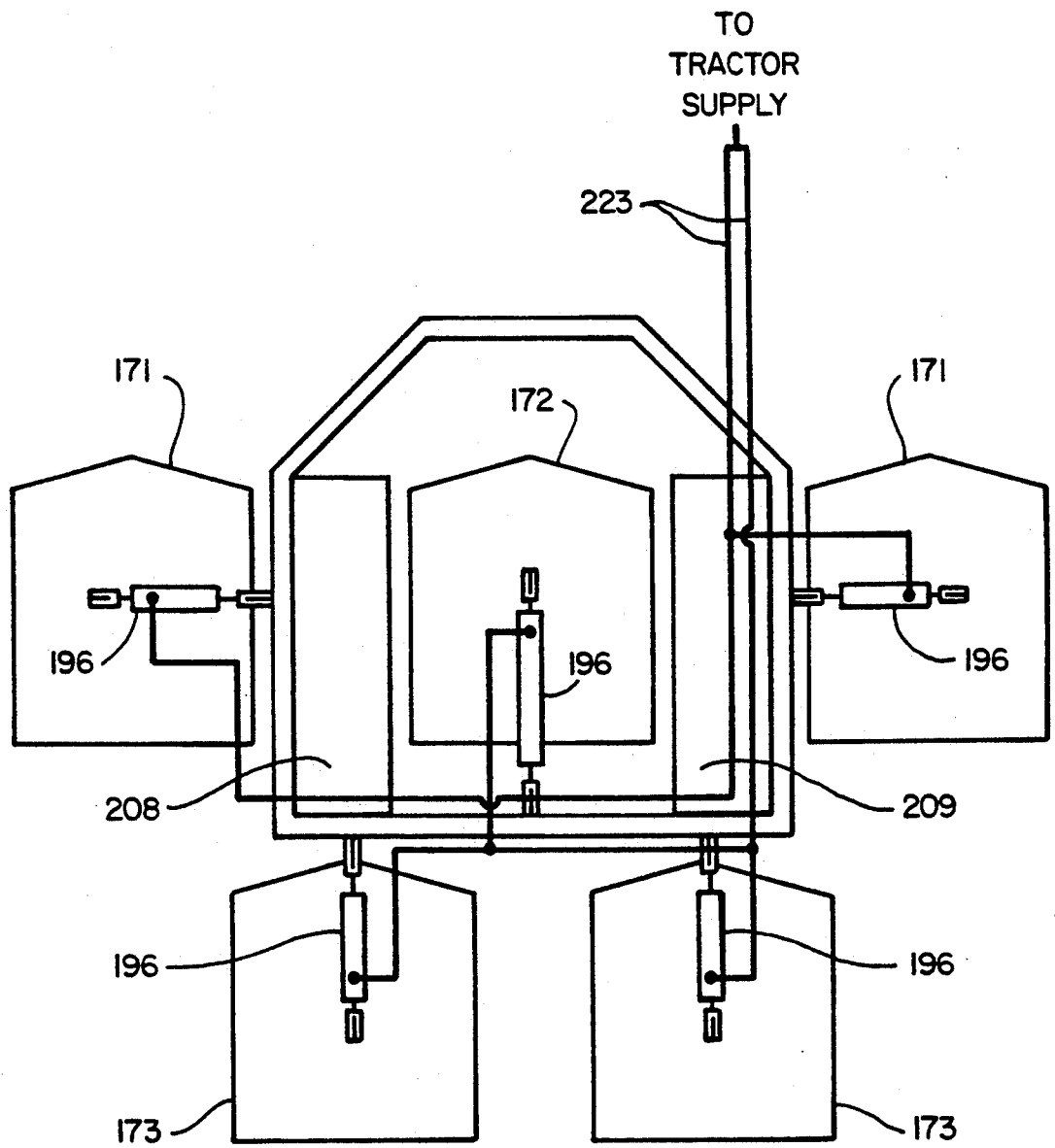
FIG_20

WIDE AREA LAWNMOWER

This invention pertains generally to lawn mowing equipment and, more particularly, to a wide area lawn mower for use in cutting large areas of grass such as those found at golf courses, athletic fields, and parks.

Lawn mowers for use in large areas are usually attached to a motorized vehicle such as a tractor or constructed integrally with a propelling vehicle. Mowers used with tractors have an advantage in that the tractors can be used for other purposes, but this usually requires that the mower be disconnected from the tractor, which can be a time consuming procedure. Some mowers can, for example, take as long as 15-20 hours to connect to or disconnect from a tractor, which is somewhat of an inconvenience.

Wide area mowers generally have a plurality of cutting units, e.g. reels, which may be arranged in an overlapping pattern to avoid leaving uncut areas of grass between the different cutters. This problem is commonly known as "stripping". While it is relatively easy to arrange the cutting units to avoid stripping when the mower travels in a straight line, stripping can still occur when the mower goes around curves and the cutters follow different paths relative to each other. This problem increases as the curvature become sharper, and stripping therefore limits the curves which many mowers can cut.

Mowers with multiple cutters can also require relatively high maintenance and frequent adjustment of parts such as belts and pulleys associated with the various cutters.

It is in general an object of the invention to provide a new and improved wide area mower for cutting large areas of grass.

Another object of the invention is to provide a lawnmower of the above character which overcomes the limitations and disadvantages of wide area mowers heretofore provided.

These and other objects are achieved in accordance with the invention by providing a wide area mower which can be attached to and detached from a tractor in a relatively short time. In one disclosed embodiment, the mower has a main frame which is detachably connected to the rear mount of a tractor, swing frames pivotally connected to the main frame for movement into and out of engagement with the side mounts of the tractor, means detachably locking the swing frames in engagement with the side mounts, and mowing heads mounted on the frames to the sides and rear of the tractor. Each of the mowing heads includes a horizontally extending deck and a grass cutting blade rotatively driven in a generally horizontal plane beneath the deck by a hydraulically actuated motor. Ground engaging wheels attached to the decks position the blades a predetermined distance above the ground, and anti-scalping rollers mounted on the undersides of the decks project below the blades for engagement with high areas of the ground to prevent the blades from contacting the ground in the event that the heads pass over uneven ground.

In another disclosed embodiment, the mower includes a frame adapted for connection to a towing vehicle, a pair of side decks positioned on opposite sides of the frame, a center deck positioned between the side decks, a pair of rear decks positioned to the rear of and between the side decks and the center deck, grass cutting blades rotatively driven in a generally horizontal plane beneath the decks, ground engaging wheels at the front and rear of each deck for supporting the blades at predetermined heights above the ground, the wheels at the rear of the side decks and the center deck being aligned with the wheels at the front of the rear decks, and means pivotally mounting the decks to the frame so that the decks can follow the contour of ground over which they pass.

FIG. 1 is a left front isometric view of one embodiment of a wide area mower according to the invention.

FIG. 2 is a right rear isometric view of the embodiment of FIG. 1.

FIG. 3 is a left rear isometric view of the embodiment of FIG. 1, showing the mower decks in raised positions.

FIG. 4 is an exploded isometric view of frame assembly in the embodiment of FIG. 1.

FIG. 5 is an exploded isometric view of the side mower deck in the embodiment of FIG. 1.

FIG. 6 is an exploded isometric view of the rear mower deck in the embodiment of FIG. 1.

FIG. 7 is an exploded isometric view of the rear portion of the frame assembly and some of the hydraulic components in the embodiment of FIG. 1.

FIGS. 8-10 are operational views of the embodiment of FIG. 1.

FIGS. 11 and 12 are schematic diagrams of the hydraulic systems in the embodiment of FIG. 1.

FIG. 13 is a rear isometric view of another embodiment of a wide area mower according to the invention.

FIG. 14 is fragmentary isometric view of the embodiment of FIG. 13.

FIG. 15 is an isometric view of the frame in the embodiment of FIG. 13.

FIG. 16 is an exploded isometric view of the frame and lift wings for the mower decks in the embodiment of FIG. 13.

FIG. 17 is an exploded isometric view of one of the mower decks in the embodiment of FIG. 13.

FIG. 18 is a fragmentary isometric view of the embodiment of FIG. 13, illustrating one of the mower decks in its normal operating position.

FIGS. 19 and 20 are schematic diagrams of the hydraulic systems in the embodiment of FIG. 13.

In FIG. 1, the invention is illustrated in conjunction with a tractor 21, which in this particular example is a John Deere Model 1070, although any suitable tractor can be used. The tractor has a conventional 3-point mount 22 at the rear and mounts 23 on the sides for the attachment of auxiliary equipment. In the case of the John Deere tractor shown, mounts 23 are commonly used for mounting a loader (not shown) which extends in front of the tractor.

In the embodiment of FIG. 1, the mower has a U-shaped main frame 26 which includes a rear section 27 and side sections 28. The rear section of the frame extends across the rear of the tractor is affixed to the 3-point mount by a top link 29 and side links 31. The side sections extend along the sides of the tractor outboard of the rear tires to points near the fronts of those tires. The frame is formed as a rigid weldment of 3×4 inch box tube, with mounts 32, 33 for the top and side links. The links are connected to the 3-point mount by removable pins 34 which permit the mower to be readily attached to and detached from the tractor.

Swing frames 36 are pivotally connected to the front ends of the side sections of frame 26 for movement into and out of engagement with the mounts 23 at the sides of the tractor. The swing frames have pads 37 which rest upon the mounts when they are engaged. The swing frames are connected to the main frame by hinge pins 38, with links 39 locking the swing arms in the inner or engaged position. The hinge pins are received in knuckles 40a, 40b at the confronting ends of the frames, and the lock links are pivotally connected to the main frame by bolts 41. The lock links are detachably connected to the swing frames by removable pins 42 which pass through aligned openings in the links and in vertically spaced, horizontally extending pairs of flanges 43 affixed to the swing frames, with the links being received between the flanges in the locking position.

The frame is supported by ground engaging wheels 46 which are mounted on flanges 47 that depend from the side members of the frame. Jack stands 48, 49 are provided for supporting the frame in an elevated position when the mower is detached from the tractor, with jack stands 48 being positioned at the rear corners of the main frame and jack stands 49 being mounted on the swing frames. When not in use, stands 49 are stowed in an inverted position at the rear of the main frame.

A plurality of mowing heads are mounted on the frame assembly. These include side mower decks 51 which are mounted on the swing arms on opposite sides of the tractor and a rear mower deck 52 which is mounted on the rear section of the main frame to the rear of the tractor.

Each of the side mower decks includes a horizontally extending deck 53 with a pair of hydraulically actuated motors 54 mounted thereon, and grass cutting blades 56 mounted on the motor shafts for rotation in generally horizontal planes beneath the deck. Chain link guards 57 extend along the front and rear edges of the decks to prevent rocks and other projectiles from being thrown out from under the decks by the rotating blades. In the particular embodiment shown, the side decks each have two blades, but a greater or lesser number can be employed, if desired, to provide a wider or narrower cutting area.

The side decks are floatably mounted on lift wings 59 and have wheels 61, 62 which engage the ground and follow the contour of the terrain over which the decks pass. The lift wings are pivotally connected to the swing frames by spindles 63 which are mounted in bushings 64 on the swing frames. The decks are pivotally connected to the lift wings for movement about mutually perpendicular axes so that they can follow the contour of the ground. Pivot bolts 66 connect mounting flanges 67 on the deck to mounts 68 which are hingedly mounted on the lift arms. The hinge axes are parallel to the axes of spindles 63 and perpendicular to the axes of the pivot bolts.

Wheels 61, 62 are mounted on forks 71, 72 which are pivotally mounted in bushings on arms 73, 74 for swivelling movement about vertically extending axes. A series of spacers 76 is placed on the spindle of each fork, and the height of the blades above the ground, i.e. the height of the cut, is determined by the number of spacers beneath the bushings. The forks are retained in the bushings by Lynch pins 77. To minimize the power required for cutting, the wheels can be adjusted so that the front side of each deck is slightly lower than the rear side so the blades only have to cut through the grass during the front half of their rotation.

Anti-scalping rollers 78 are mounted under the decks to prevent the blades from contacting the ground in the event that the mower travels over uneven terrain where the ground beneath the decks rises above the level of the ground engaged by the deck wheels. These rollers extend about one inch below the planes of the blades and will engage raised ground to prevent the blades from contacting it.

Hydraulically actuated cylinders 79 are connected between the swing arms and the lift wings for raising the side decks to a generally vertical position, and latch hooks 81 hold the decks in the raised position. Kick-out rollers 82 mounted on arms 83 which extend from the swing frames engage the decks as they are raised, guiding them to their vertical position. In that position, the decks are held firmly against the kick-out rollers by springs 84.

Rear mower deck 52 has a horizontally extending deck 86 with three hydraulically actuated motors 87 mounted thereon, and grass cutting blades 88 mounted on the motor shafts. Chain link guards 89 extend along the front and rear edges of this deck to prevent rocks and other projectiles from being thrown by the rotating blades.

The rear deck is floatably mounted on a lift wing 91 and has ground engaging wheels 92. The lift wing is pivotally connected to the rear section of the main frame by pivot pins 93 which are received in mounts 94 on the frame. Like the side decks, the rear deck is pivotally connected to the lift wing for movement about mutually perpendicular axes so that it, too, can follow the contour of the ground. In this regard an arched mounting arm 96 is pivotally connected to the deck by pins 97 which are received in bushings 98 affixed to crossmembers 99 on the deck. Arm 96 is pivotally connected to the lift wing by a bolt 101, the axis of which is perpendicular to the axes of pins 97.

Wheels 92 are mounted on forks 102 which are pivotally mounted in bushings on arms 103 for swivelling movement about vertically extending axes. As in the case of the side decks, the cutting height of the blades in the rear deck is adjusted by means of spacers 104 on the fork spindles. Here again, the power required for cutting can be minimized by adjusting the wheels so that the front side of the deck is slightly lower than the rear side so the blades only have to cut through the grass during the front half of their rotation.

Anti-scalping rollers 106, 107 similar to rollers 78 prevent the blades in the rear deck from contacting high spots in the ground. Rollers 106 are spaced across the rear of the deck, and roller 107 is mounted on a pair of downwardly curved arms 109 at the front of the deck. The rollers extend about one inch below the planes of the blades and will contact high spots to prevent the blades from striking them.

A hydraulically actuated cylinder 111 is connected between the main frame and the lift wing for raising the rear deck, and a latch hook 112 holds the deck in the raised position. Kick-out rollers 113 are mounted on arms 114 on the frame to guide the deck as it is raised and to help steady it in the raised position.

The mower decks and the blades therein are positioned in a manner which permits the mower to cut around very sharp curves as well as in straight lines without leaving any uncut strips between the blades. In this regard, it will be noted that there is substantial overlap between the blades in the side decks and the blades in the rear deck, as well as between the adjacent blades in the individual decks. The overlap between the inner blades in the side decks and the outer blades in the rear deck is on the order of one-half of the length of the blades, and the blades in the individual decks are offset obliquely of each other so that the gap between the blades will not result in an uncut strip when the mower is travelling in a forward direction or around a curve.

A hydraulic pump 116 provides pressurized fluid for operating the blade motors. The pump is mounted on a mount 117 on the rear section of the main frame and is driven from the power take-off at the rear of the tractor by a drive shaft 118 and a step-up transmission 119. The transmission is mounted on the back of the pump, and the shaft passes beneath the pump to the transmission. The shaft speed is on the order of 500–600 rpm, and the transmission provides a step-up of approximately 3.8:1, which makes it possible to use a smaller pump than would otherwise be required to supply the amount of fluid required by the motors. The shaft is connected to the power take-off by a quick release connector which is readily engaged and disengaged as the mower is attached to and detached from the tractor.

The pump has three sections or stages, and pressurized fluid from the pump is delivered to a manifold 121 which is mounted on the rear section of the frame near the pump. Lines 122 carry the fluid from the pump to the manifold, and lines 123, 124 and 126 carry the fluid from the manifold to the motors in the side and rear decks. The motors in each individual deck are fed in series, and the three decks are fed in parallel.

Rectangular tanks or reservoirs 127, 128 for the fluid are mounted on the frame, and fluid is carried between the two tanks through the rear section of the frame. Fluid is returned to the tanks from the motors by return lines 131–133 and by case drain lines 136–138, and fluid is supplied to the pump from the tank 128 by lines 139.

Pressure in the motor operating system is monitored by a gauge 141 connected to manifold 121 by a line 142. The gauge is removably mounted on the tractor near the operator's seat and is removed when the trailer is detached.

Means is provided for interrupting the application of fluid to the motors to stop the blades when the decks are raised. This means includes a solenoid operated valve 143 connected to the manifold and limit switches 144 which are actuated when the decks are raised or inclined by more than a predetermined amount, e.g. an angle of 15 degrees.

Pressurized fluid for operating the cylinders which raise the decks is obtained from the hydraulic system of the tractor through supply lines 146 which are connected to the tractor's system by quick connect/disconnect fittings. The fluid is supplied to the cylinders via control valves 147 and lines 148–150, with each valve controlling the operation of one cylinder. The control valves are mounted on a console 153 which is removably mounted on the armrest of the operator's seat on the tractor. When the mower is detached from the tractor, the console is mounted on a bracket 154 on the rear lift wing.

In operation, the mower of FIG. 1 is attached to the tractor, with wheels 46 resting on the ground, the mower decks are lowered so that their wheels also rest on the ground, blade motors 54, 87 are actuated, and the tractor is driven over the area to be mowed. Being free-floating, the decks follow the contour of the ground, and the grass is cut to a substantially uniform length. In the event that uneven terrain is encountered, the anti-scalping rollers will prevent the blades from striking the ground. Whenever one of the decks is raised by an angle of more than 15 degrees, the limit switches and solenoid operated valve cut off the supply of fluid to the motors, stopping the blades.

To detach the mower from the tractor, the mower assembly is lifted off the ground by the 3-point hitch on the tractor, thereby lifting swing frame pads 37 off the mounts 23 at the sides of the tractor. Pins 42 are then removed, and the swing frames and side decks are swung out away from the tractor. Jack stands 48, 49 are then lowered to support the mower, drive shaft 118 and hydraulic lines 146 are disconnected from the power take-off and hydraulic system of the tractor, the control valve console and pressure gauge are removed from the tractor, and pins 34 are removed to disconnect the links from the 3-point hitch. The tractor can then be driven away from the mower. The entire process takes no more than about 20 minutes, which is a significant improvement over the 20 hours it takes to disconnect other mowers from tractors. The mower is attached to the tractor by substantially the reverse of this process, which can also be done very rapidly.

In the embodiment of FIG. 13, the mower has a frame 156 with side members 157, a rear crossmember 158, and front members 159, 161. Ground engaging wheels 162 are mounted on depending flanges 163 toward the rear of the side members, and a drawbar or tongue 164 extends in a forward direction from front member 159, with a hitch 166 at the front end thereof for connection to a tractor 167. The frame is formed as a rigid unitary weldment of a suitable material such as 3×3 inch box tube. A jackstand 168 is mounted on the tongue for supporting the front portion of the mower when it is disconnected from the tractor. The jackstand is stowed in a horizontal position and is turned to a vertical position for use.

Five mower decks are mounted on frame 156. These include a pair of side decks 171 on opposite sides of the frame, a center deck 172 positioned between the side decks, and a pair of rear decks 173 positioned to the rear of and between the side decks and the center deck. Each of the decks includes a horizontally extending deck 174, with a hydraulically actuated motor 176 mounted thereon and a grass cutting blade 177 attached to the shaft of the motor for rotation in a generally horizontal plane beneath the deck. Chain link guards 178 extend along the front and rear edges of the decks to prevent rocks and other projectiles from being thrown out from under the decks by the rotating blades.

The decks are floatably mounted on lift wings 179 and have wheels which engage the ground and follow the contour of the terrain over which the decks pass. The lift wings are pivotally connected to the frame by spindles 181 and mounts 182, with the two side decks being positioned outboard of side members 157, the central deck being positioned in front of rear crossmember 158, and the rear decks positioned to the rear of the rear crossmember.

As in the embodiment of FIG. 1, each of the decks is pivotally connected to the associated lift wing for movement about mutually perpendicular axes so that it can follow the contour of the ground. An arched mounting arm 183 is hingedly connected to each deck by pins 184 which extend along axes parallel to the longitudinal axis of the mower, or the direction of travel. This arm is pivotally connected to the lift wing by a bolt 186, the axis of which is perpendicular to the axes of pins 184.

Wheels 188 are mounted in forks 189 at the front of the side and center decks and at the rear of the rear decks, and wheels 191 are mounted in forks 192 at the rear of the side and center decks and at the front of the rear decks. The shafts of the forks are mounted in arms 193 which extend from the decks, with spacers 194 on the shafts determining the height of the blades above the ground. As in the embodiment of FIG. 1, the power required for cutting can be minimized by adjusting the wheels so that the front side of the deck is slightly lower than the rear side so the blades only have to cut through the grass during the front half of their rotation.

Wheels 188 are similar to wheels 191, but forks 189 and 191 differ in that forks 189 have round shafts but forks 192 have square shafts. Wheels 188 are thus free to swivel about the axes of their fork shafts, whereas wheels 191 are constrained against such swivelling. Wheels 191 are also aligned along an axis slightly to the rear of the main wheels 162 of the mower. Having these wheels aligned in this manner and constrained against swivelling helps to keep decks under control and in proper alignment on curves so that the mower can cut around relatively sharp curves without leaving uncut strips of grass between the blades in the different decks. The axis of wheels 191 is preferably kept as close to the axis of wheels 162 as possible to avoid any appreciable skidding of the wheels when going around curves.

If needed, anti-scalping rollers can be mounted under the decks, as in the embodiment of FIG. 1, to prevent the blades from contacting high spots in the ground. However, with only one blade in each deck, the deck wheels are close enough to each other that scalping is generally not a problem even in relatively uneven terrain.

Hydraulically actuated cylinders 196 are connected between the frame and the lift wings for raising all five of the decks to substantially vertical positions, and latch hooks 197 hold the decks in the raised position. Kick-out rollers 198 are mounted on arms 199 on the frame to guide the decks as they are raised and to help steady them in the raised position. In that position, the decks are held firmly against the kick-out rollers by springs 201.

Pressurized fluid for operating the blade motors is provided by a pump 203 similar to pump 116. In this embodiment, however, the pump and step-up transmission are mounted on the tractor, and the lines are removably connected to the pump with quick connect-/disconnect fittings. The drive shaft is permanently connected to the power take-off and to the transmission.

Lines 204, 206 and 207 carry pressurized fluid from the pump to the motors in the side, center and rear decks, respectively, with the motors in the two side decks being fed in series with each other and the motors in the two rear decks being fed in series with each other.

The fluid is stored in reservoirs or tanks 208, 209 which are mounted on the side members of the frame, with a relatively large line 211 interconnecting the two tanks. In this embodiment, the frame is utilized in the return line, and fluid is returned to the tanks from the motors by lines 212–214 which are connected between the motors and the frame. Fluid leaking into the motor cases is returned to the tanks by lines 216–219, and fluid is delivered to the pump from tank 208 by lines 221. As noted above lines 204, 206, 207 and 221 are connected to the pump with quick connect/disconnect fittings.

Pressurized fluid for operating the cylinders which raise the decks is obtained from the hydraulic system of the tractor through supply lines 223 which are connected to the tractor's system by quick connect/disconnect fittings.

As in the embodiment of FIG. 1, limit switches and a solenoid operated valve interrupt the application of fluid to the motors to stop the blades when the decks are raised.

Operation and use of the embodiment of FIG. 13 is similar to that previously described, except attachment and detachment of the mower are even easier in this embodiment, requiring only the insertion or removal of a pin and the connection or disconnection of a few hydraulic lines.

It is apparent from the foregoing that a new and improved wide area mower has been provided. While only certain presently preferred embodiments have been described in detail, as will be apparent to those familiar with the art, certain changes and modifications can be made without departing from the scope of the invention as defined by the following claims.

We claim:

1. Lawn mowing apparatus, comprising: a tractor having rear and side mounts for attachment of auxiliary equipment, a main frame detachably connected to the rear mount, swing frames pivotally connected to the main frame for movement into and out of engagement with the side mounts, means detachably locking the swing frames in engagement with the side mounts, and mowing heads mounted on the frames to the sides and rear of the tractor for cutting grass over a relatively wide area.

2. The lawn mowing apparatus of claim 1 wherein the main frame is a U-shaped frame having a rear section positioned to the rear of the tractor and a pair of side sections which extend along opposite sides of the tractor.

3. The lawn mowing apparatus of claim 1 wherein the main frame is connected to the rear mount with removable pins, and the means detachably locking the swing frames in engagement with the side mounts comprises removable pins.

4. The lawn mowing apparatus of claim 1 wherein each of the mowing heads comprises a horizontally extending deck and a grass cutting blade rotatively driven in a generally horizontal plane beneath the deck.

5. The lawn mowing apparatus of claim 4 including ground engaging wheels attached to the deck for positioning the blade a predetermined distance above the ground.

6. The lawn mowing apparatus of claim 5 including anti-scalping rollers mounted on the underside of the deck and projecting below the blade for engagement with portions of the ground which rise above portions contacted by the wheels to prevent the blade from contacting the ground in the event that the head passes over uneven ground.

7. The lawn mowing apparatus of claim 4 including means for raising the decks of the mowing heads mounted on the swing frames to a generally vertical position.

8. The lawn mowing apparatus of claim 4 wherein the decks are pivotally mounted to the frames and adapted to follow the contour of the ground over which they pass, and the apparatus includes means for stopping rotation of the blades in the event that one of the decks rises away from the ground by more than a predetermined amount.

9. The lawn mowing apparatus of claim 1 including hydraulically actuated motors on the mowing heads, a pump mounted on the main frame for supplying pressurized fluid to the motors, and a drive shaft operatively connecting the pump with a power take-off on the tractor.

10. The lawn mowing apparatus of claim 9 including a step-up transmission between the power take-off and the pump for driving the pump at a higher speed than the power take-off.

11. Lawn mowing apparatus for use with a tractor having rear and side mounts for attachment of auxiliary equipment, comprising a U-shaped frame having a rear section adapted to extend along the rear of the tractor and side sections adapted to extend along opposite sides of the tractor, means for detachably connecting the rear section to the rear mount, swing frames pivotally connected to the side sections for movement into and out of engagement with the side mounts, means for detachably locking the swing frames in engagement with the side mounts, and mowing heads mounted on the rear section of the U-shaped frame and on the swing frames for cutting grass over a relatively wide area.

12. The lawn mowing apparatus of claim 11 wherein the means for detachably connecting the rear section of the U-shaped frame to the rear mount and the means for detachably locking the swing frames in engagement with the side mounts comprise removable pins.

13. The lawn mowing apparatus of claim 11 wherein the mowing heads comprise horizontally extending decks, hydraulically actuated motors mounted on the decks with vertically extending shafts, and grass cutting blades mounted on the shafts for rotation in generally horizontal planes beneath the decks.

14. The lawn mowing apparatus of claim 13 including ground engaging wheels mounted on the decks for positioning the blades in the mowing heads a predetermined distance above the ground, and means pivotally mounting the decks on the frames so that the mowing heads can follow the contour of ground over which they pass.

15. The lawn mowing apparatus of claim 14 including anti-scalping rollers mounted on the undersides of the decks and projecting below the blades for engagement with portions of the ground which rise above portions contacted by the wheels to prevent the blades from contacting the ground in the event that the heads pass over uneven ground.

16. The lawn mowing apparatus of claim 13 including a pump adapted to be driven by a power take-off on the tractor for supplying pressurized operating fluid to the motors.

17. The lawn mowing apparatus of claim 11 including means for raising the mowing heads which are mounted on the swing frames to a generally vertical position.

18. Lawn mowing apparatus, comprising: a frame adapted for connection to a towing vehicle and having a pair of axially aligned wheels, a pair of side decks positioned on opposite sides of the frame, a center deck positioned between the side decks, a pair of rear decks positioned to the rear of and between the side decks and the center deck, grass cutting blades rotatively driven in generally horizontal planes beneath the decks, ground engaging wheels at the front and rear of each deck for supporting the blades at predetermined heights above the ground, the wheels at the rear of the side decks and the center deck being aligned with the wheels at the front of the rear decks along an axis substantially parallel to and slightly to the rear of the axis of the pair of axially aligned wheels, and means pivotally mounting the decks to the frame so that the decks can follow the contour of ground over which they pass.

19. The lawn mowing apparatus of claim 18 including swivel mounts for the wheels at the front of the side and center decks and at the rear of the rear decks, and non-swivel mounts for the wheels at the rear of the side and center decks and at the front of the rear decks.

20. The lawn mowing apparatus of claim 18 including anti-scalping rollers mounted on the undersides of the decks and projecting below the blades for engagement with portions of the ground which rise above portions contacted by the wheels to prevent the blades from contacting the ground in the event that the heads pass over uneven ground.

21. The lawn mowing apparatus of claim 18 wherein the frame includes a pair of side members and a crossmember, with the side decks being mounted on the side members outboard of the frame, the center deck being mounted on the crossmember and positioned in front of the crossmember, and the rear decks being mounted on the crossmember and positioned to the rear of the crossmember.

22. The lawn mowing apparatus of claim 18 including means for raising the decks to a generally vertical position.

23. The lawn mowing apparatus of claim 18 including hydraulically actuated motors for driving the blades.

* * * * *